US010589240B2

(12) United States Patent
Jones et al.

(10) Patent No.: US 10,589,240 B2
(45) Date of Patent: Mar. 17, 2020

(54) METHOD AND APPARATUS FOR BLENDING VISCOUS FLUIDS AND ADDITIVES

(71) Applicant: Heatec, Inc., Chattanooga, TN (US)

(72) Inventors: Greg Jones, Chattanooga, TN (US); Andrew Bryson, Soddy Daisy, TN (US)

(73) Assignee: Heatec, Inc., Chattanooga, TN (US)

( * ) Notice: Subject to any disclaimer, the term of this patent is extended or adjusted under 35 U.S.C. 154(b) by 519 days.

(21) Appl. No.: 15/476,066

(22) Filed: Mar. 31, 2017

(65) Prior Publication Data

US 2017/0292228 A1 Oct. 12, 2017

Related U.S. Application Data

(60) Provisional application No. 62/319,587, filed on Apr. 7, 2016.

(51) Int. Cl.
*B01F 3/02* (2006.01)
*B01F 3/14* (2006.01)
(Continued)

(52) U.S. Cl.
CPC .............. *B01F 15/065* (2013.01); *B01F 3/14* (2013.01); *B01F 5/0057* (2013.01); *C08L 95/00* (2013.01); *B01F 2015/062* (2013.01)

(58) Field of Classification Search
CPC ........ B01F 15/065; B01F 3/14; B01F 5/0057; B01F 2015/062; B01F 3/12; C08L 95/00; B28C 5/06; B28C 5/46
(Continued)

(56) References Cited

U.S. PATENT DOCUMENTS 3,201,093 A * 8/1965 Smith ................... B01F 5/0057
366/28
3,747,899 A 7/1973 Latinen et al.
(Continued)

OTHER PUBLICATIONS

International Search Report and Written Opinion of Counterpart PCT Application No. PCT/US2017/025416 filed Mar. 31, 2017.

*Primary Examiner* — Huy Tram Nguyen
(74) *Attorney, Agent, or Firm* — Chambliss, Bahner & Stophel, P.C.

(57) ABSTRACT

A blender for blending viscous material and additive material by vortex action includes an upper section and a lower section. The upper section has a receiving portion, a viscous material inlet that is in fluid communication with the receiving portion, and an additive inlet that is in fluid communication with the receiving portion. The lower section is attached to and disposed below the upper section, said includes a blending portion that is in fluid communication with the receiving portion of the upper section. The blending portion is shaped so as to facilitate the blending of the additive material entering the receiving portion through the additive inlet with the viscous material entering the receiving portion through the viscous material inlet. The blender includes an outlet for blended material that is in fluid communication with the blending portion of the lower section. A method of blending additive materials with asphalt cement employs a blender having no moving parts that is adapted to blend asphalt cement and additive materials by vortex action.

16 Claims, 5 Drawing Sheets

(51) Int. Cl.
  *C08L 95/00* (2006.01)
  *B01F 15/06* (2006.01)
  *B01F 5/00* (2006.01)
(58) Field of Classification Search
  USPC .......................................................... 366/7, 2
  See application file for complete search history.

(56) References Cited

U.S. PATENT DOCUMENTS

| | | | |
|---|---|---|---|
| 4,184,771 A | * | 1/1980 | Day ...................... B01F 5/0068 366/3 |
| 4,662,759 A | | 5/1987 | Leibee et al. |
| 2008/0298160 A1 | | 12/2008 | Kay et al. |
| 2012/0138276 A1 | | 6/2012 | Tsubouchi et al. |

* cited by examiner

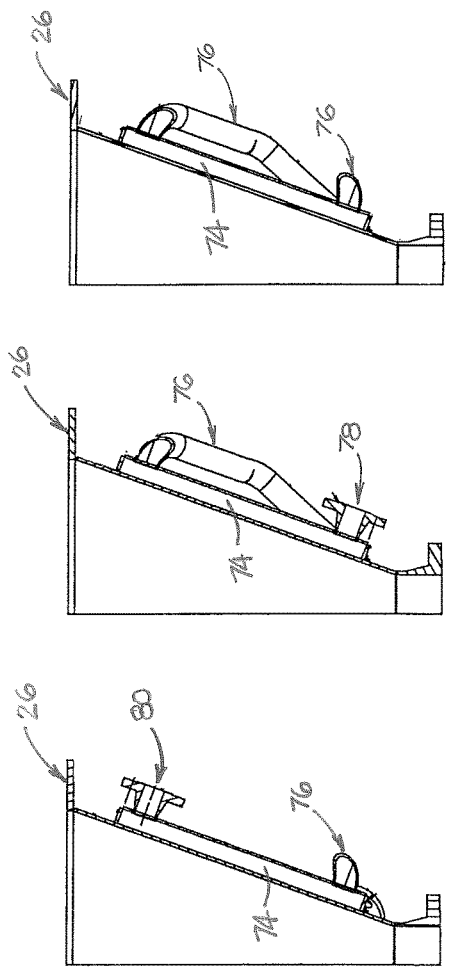
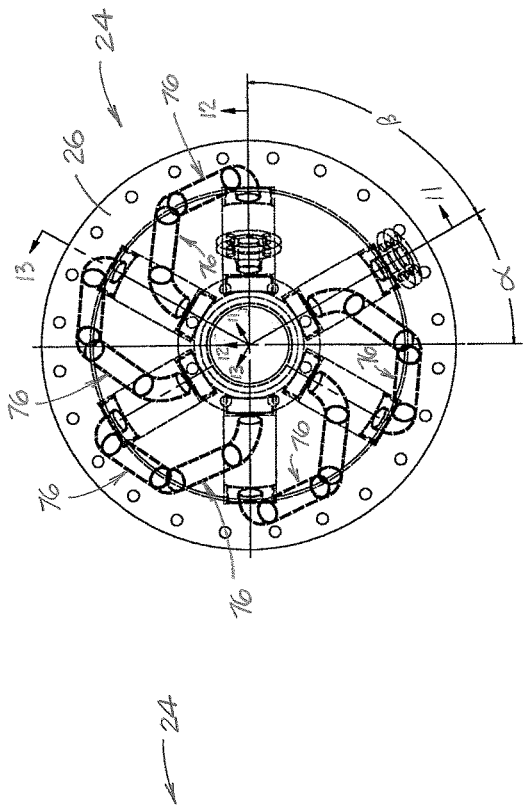
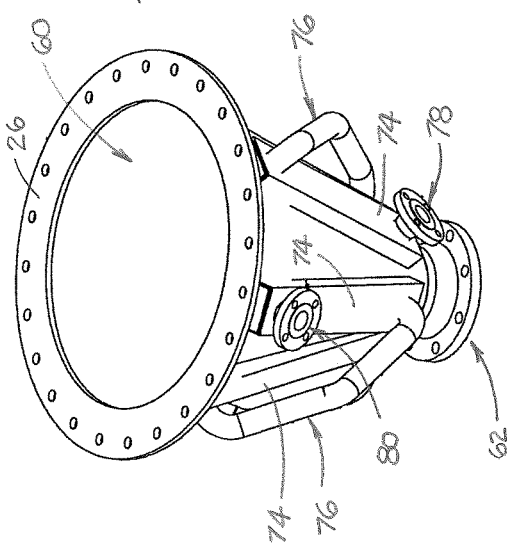
FIGURE 13
FIGURE 10
FIGURE 12
FIGURE 11
FIGURE 9

METHOD AND APPARATUS FOR BLENDING VISCOUS FLUIDS AND ADDITIVES

CROSS-REFERENCE TO RELATED APPLICATION

This application claims the benefit of U.S. Provisional Patent Application No. 62/319,587 which was filed on Apr. 7, 2016.

FIELD OF THE INVENTION

This invention relates to the blending of viscous fluids such as asphalt cement and additives which may be in solid particulate form, including but not limited to pellets and powders, or they may be liquid form. More specifically, the invention comprises a blender which does not have any moving parts that may be used in blending asphalt cement and any of various additives that are commonly incorporated into asphalt concrete.

BACKGROUND AND DESCRIPTION OF THE PRIOR ART

Many miles of roadways and many acres of parking lots are paved with asphalt concrete, which is comprised of approximately 94% by weight aggregate materials and approximately 6% by weight asphalt cement. The asphalt cement binds the aggregate materials together, forming a strong but flexible pavement. Although technically a liquid, asphalt cement is extremely viscous, approaching a solid at ambient temperatures. One problem with the asphalt cement component of a roadway is that it cracks when cold and deforms when hot. Pavement life can be extended significantly by adding elastomeric polymers such as styrene-butadiene-styrene ("SBS") block copolymers or styrene-butadiene rubber ("SBR") latex to the asphalt concrete composition. It is also known to include reclaimed rubber from recycled tires, ground tire rubber ("GTR"), polyethylene, polypropylene, ethyl-vinyl-acetate ("EVA"), polyvinyl chloride ("PVC"), gilsonite, sulfur cross-linking agents, liquid additives, liquid or solid anti-stripping agents, flux oil, polyolefins or blends of these materials in the composition.

In many circumstances, it is desirable to add the additives such as elastomeric polymers to the asphalt cement prior to mixing the asphalt cement with the aggregates. However, because the use of particulate plastics in asphalt concrete is believed to strengthen the paving material by adding a slightly flexible interlocking aggregate component that bonds with the asphalt cement with a partially chemical molecular bond, it is not desirable to melt the polymers in the mixing process. Polymer additions of this type produce increased shear resistance in the paving material and make it more highly impermeable to water, preventing such water from propagating into the underlying base or subgrade. Consequently, polymers are frequently added to asphalt cement in pellet form.

Asphalt cement is commonly mixed with polymer pellets in a mixer having one or more impellers or mixing blades. Sometimes the polymer pellets are mixed with the asphalt cement in a horizontal mixing tank having impeller assemblies spaced along the length of the tank. In other configurations, polymer pellets are mixed with asphalt cement in a vertical tank having multiple impeller assemblies disposed along the length of a single vertical mixing shaft. When polymer pellets are blended with asphalt cement in conventional mixers, the mixing tanks are so large that the polymer pellets are in contact with the hot asphalt cement for a relatively long time. This extended contact time causes the pellets to partially melt and deform. Thereafter the hot mixture is usually passed through a grinding mill to reduce the asphalt cement coated pellets to smaller particulates. Because of the deformation of the polymers in the mixing tanks, the grinding mills pull and stretch some of the polymer components rather than grinding them. Some of the polymer particulates will then rejoin with other particulates. When this happens, it may be necessary to pass the mixture through the grinding mill multiple times in order to obtain a proper dispersion of the polymer particulates in the asphalt cement.

Advantages of a Preferred Embodiment of the Invention

Among the advantages of this invention is that it provides a blender for asphalt cement and polymer pellets or other additives that will create a thorough dispersion of the additives in the asphalt cement in a relatively short time, thus reducing the heating of the additives by the hot asphalt cement. Another advantage of the invention is that it provides such a blender that has no internal moving parts such as impellers or mixing blades.

Additional objects and advantages of this invention will become apparent from an examination of the drawings and the ensuing description.

Notes on Construction

The use of the terms "a", "an", "the" and similar terms in the context of describing the invention are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. The terms "substantially", "generally" and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic. All methods described herein can be performed in any suitable order unless otherwise specified herein or clearly indicated by context.

Terms concerning attachments, coupling and the like, such as "connected" and "interconnected", refer to a relationship wherein structures are secured or attached to one another either directly or indirectly through intervening structures, as well as both moveable and rigid attachments or relationships, unless specified herein or clearly indicated by context. The term "operatively connected" is such an attachment, coupling or connection that allows the pertinent structures to operate as intended by virtue of that relationship.

The use of any and all examples or exemplary language (e.g., "such as" and "preferably") herein is intended merely to better illuminate the invention and the preferred embodiments thereof, and not to place a limitation on the scope of the invention. Nothing in the specification should be construed as indicating any element as essential to the practice of the invention unless so stated with specificity. Several terms are specifically defined herein. These terms are to be given their broadest reasonable construction consistent with such definitions, as follows:

The term "aggregate materials" and similar terms refer to crushed stone and other particulate materials that are used in the production of asphalt concrete, such as, for example, crushed limestone and other types of crushed stone, crushed Portland cement concrete, shredded or comminuted mineral and cellulosic fibers, recycled asphalt product, recycled asphalt shingles, gravel, sand, lime and other particulate additives.

The term "asphalt cement" and similar terms refer to a bituminous material that is used in combination with aggregate materials in the production of asphalt concrete. Asphalt cement, with and without various additives, acts as the binder for various aggregate materials in the production of asphalt concrete.

The term "asphalt concrete" and similar terms refer to a bituminous paving mixture that is produced, using asphalt cement (with or without additives) and any of various aggregate materials, in an asphalt dryer/mixer or other asphalt concrete production plant.

The term "conductive contact" refers to a proximity between components that permits heat transfer by conduction between such components.

The term "fluid communication" refers to an operative connection or association between components which allows for flow of fluid and/or particulate material from one such component to or by means of the other.

SUMMARY OF THE INVENTION

The invention is a blender for a viscous material and any of various additive materials, whether in pellet, particulate or liquid form. The invention comprises a blender having an upper section and a lower section. The upper section includes a receiving portion for receiving the viscous material and the additive material. A viscous material inlet for the viscous material and an additive inlet for the additive material are in fluid communication with the receiving portion. The lower section is attached to and disposed below the upper section. The lower section includes a blending portion that is in fluid communication with the receiving portion of the upper section. The blending portion is shaped so as to facilitate the blending of additive material entering the adjacent receiving portion through the additive inlet with viscous material entering through the viscous material inlet. An outlet for blended material is in fluid communication with the blending portion of the lower section. The cooperation of the shape of the blending portion and the arrangement and configuration of the viscous material inlet and the inlet for additive material facilitates blending of the viscous material and the additive material by vortex action, without requiring any moving parts such as impellers or mixing blades.

A preferred embodiment of the blender includes a heat transfer component having a first thermal fluid jacket and a second thermal fluid jacket. The first thermal fluid jacket creates a first thermal fluid passage that is in conductive contact with the receiving portion of the upper section, and a thermal fluid inlet for thermal fluid is in fluid communication with the first thermal fluid passage. The second thermal fluid jacket is provided to create a second thermal fluid passage that is in conductive contact with the blending portion of the lower section. The second thermal fluid passage is in fluid communication with the first thermal fluid passage, and at least one thermal fluid outlet that is in fluid communication with the heat transfer component is provided for withdrawal of thermal fluid.

In order to facilitate an understanding of the invention, a preferred embodiment of the invention, as well as the best mode known by the inventors for carrying out the invention, is illustrated in the drawings, and a detailed description thereof follows. It is not intended, however, that the invention be limited to the particular embodiment described or to use in connection with the apparatus illustrated herein. Therefore, the scope of the invention contemplated by the inventors includes all equivalents of the subject matter recited in the claims, as well as various modifications and alternative embodiments such as would ordinarily occur to one skilled in the art to which the invention relates. The inventors expect skilled artisans to employ such variations as seem to them appropriate, including the practice of the invention otherwise than as specifically described herein. In addition, any combination of the elements and components of the invention described herein in any possible variation is encompassed by the invention, unless otherwise indicated herein or clearly excluded by context.

BRIEF DESCRIPTION OF THE DRAWINGS

The presently preferred embodiment of the invention is illustrated in the accompanying drawings, in which like reference numerals represent like parts throughout, and in which:

FIG. 9 is a front perspective view of the lower section of the preferred embodiment of the invention shown in FIGS. 1-3 and 5-8.

FIG. 10 is a top view of the lower section of the preferred embodiment of the invention that is shown in FIG. 9.

FIG. 11 is a sectional view of the portion of the lower section shown in FIG. 10, taken through line 11-11 of FIG. 10.

FIG. 12 is a sectional view of the portion of the lower section shown in FIG. 10, taken through line 12-12 of FIG. 10.

FIG. 13 is a sectional view of the portion of the lower section shown in FIG. 10, taken through line 13-13 of FIG. 10.

DESCRIPTION OF THE PREFERRED EMBODIMENTS OF THE INVENTION

Figure 2:
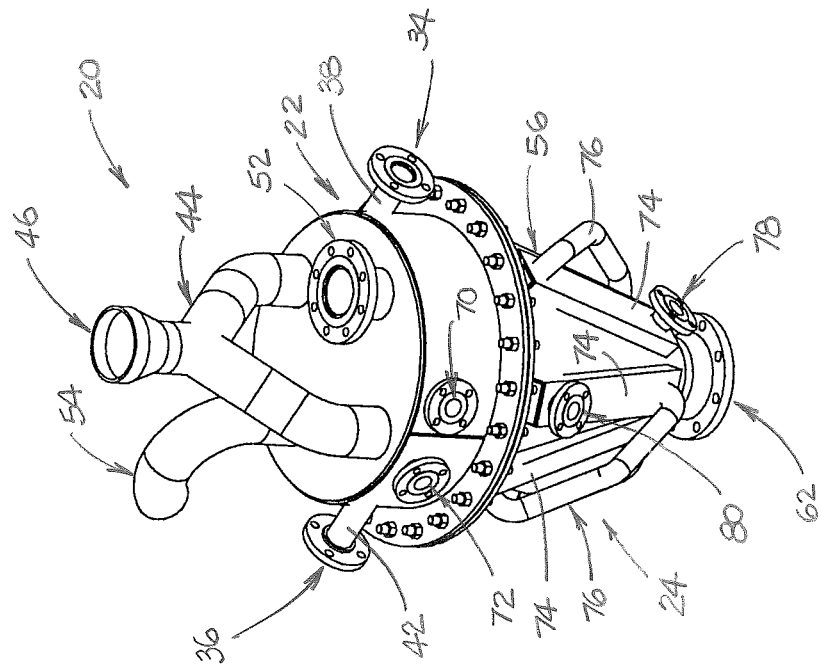
FIG. 2 is a front perspective view of the embodiment of the invention shown in FIG. 1.
Figure 1:
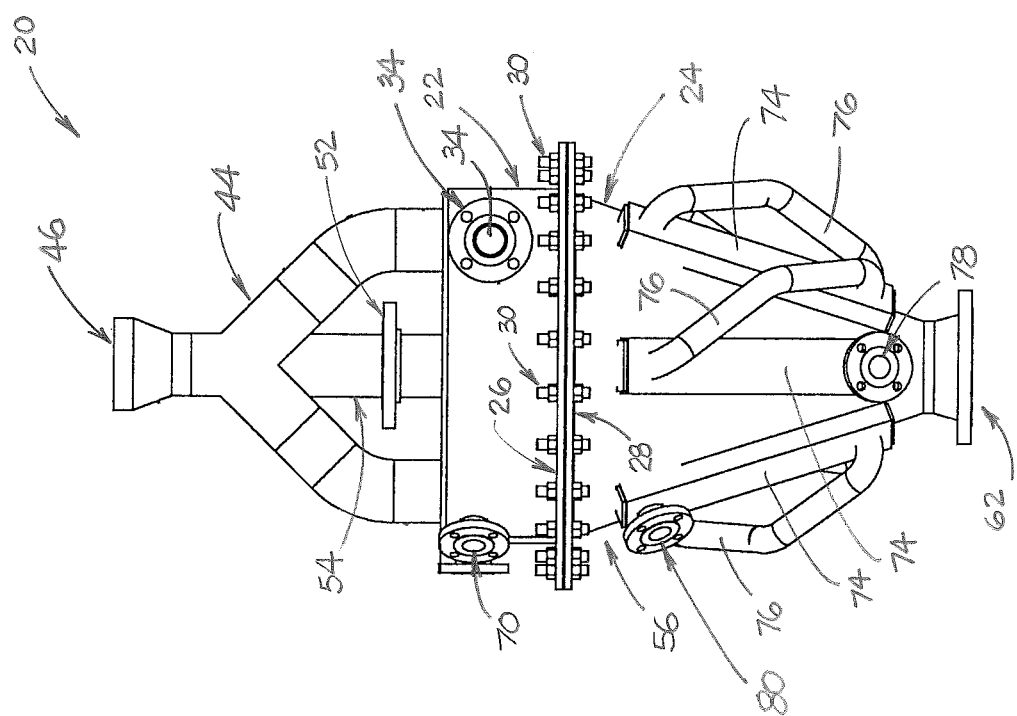
FIG. 1 is a front view of a preferred embodiment of the invention.

This description of the preferred embodiments of the invention is intended to be read in connection with the accompanying drawings, which are to be considered part of the entire written description of this invention. The drawings are not necessarily to scale, and certain features of the invention may be shown exaggerated in scale or in somewhat schematic form in the interest of clarity and conciseness.

As shown in FIGS. 1-3 and 5-13, blender 20 comprises upper section 22 and lower section 24. Upper section 22 includes peripheral flange 26, and lower section 24 has a complementary peripheral flange 28. Each of these flanges has a plurality of fastener holes that align with each other, and a plurality of bolt and nut assemblies 30 are provided to join together the upper section and the lower section. Of course, those having ordinary skill in the art will realize that the upper and lower sections can be welded together or joined together by other known means.

Figure 6:
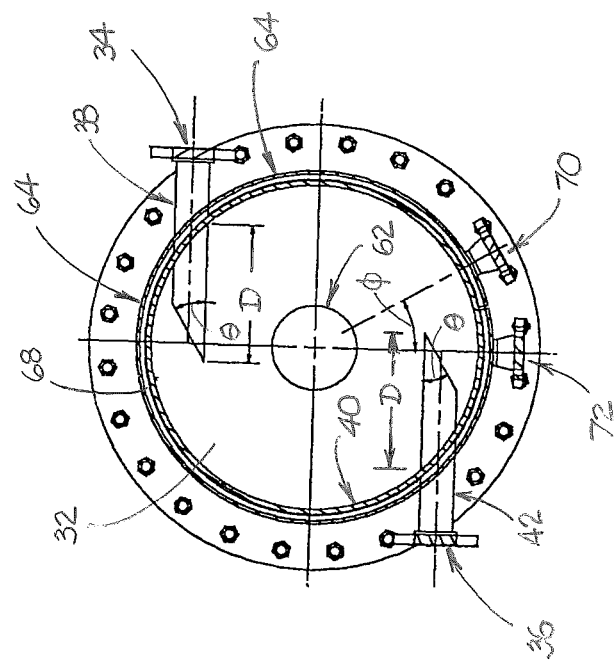
FIG. 6 is a sectional view of the embodiment of the invention shown in FIGS. 1-3 and 5, taken through line 6-6 of FIG. 5.
Figure 5:
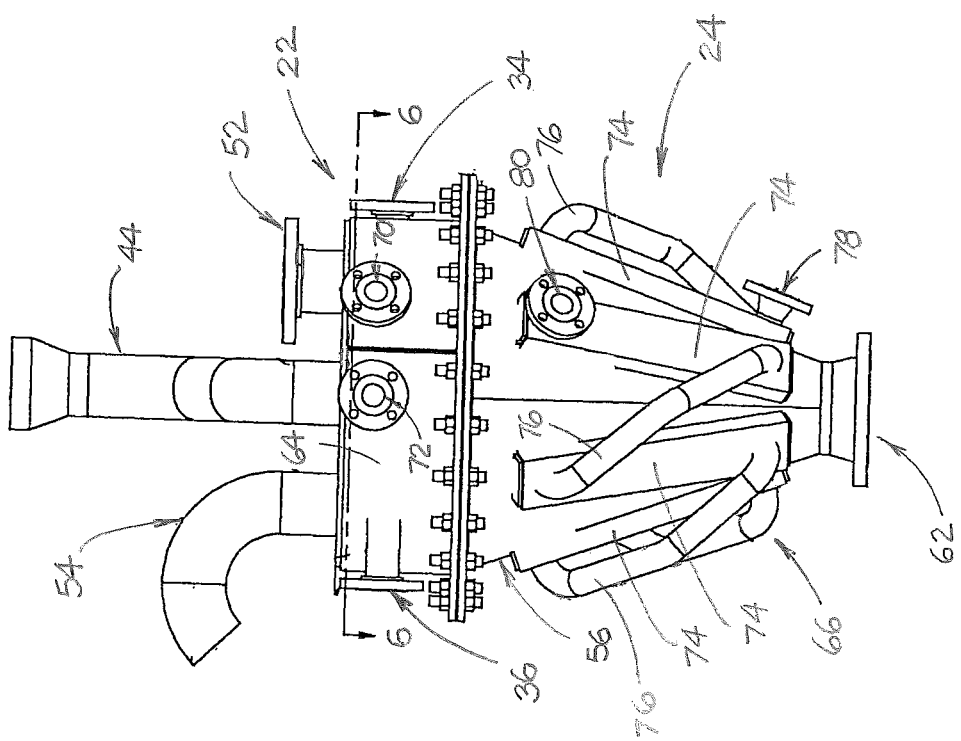
FIG. 5 is a side view of the embodiment of the invention shown in FIGS. 1-3.
Figure 7:
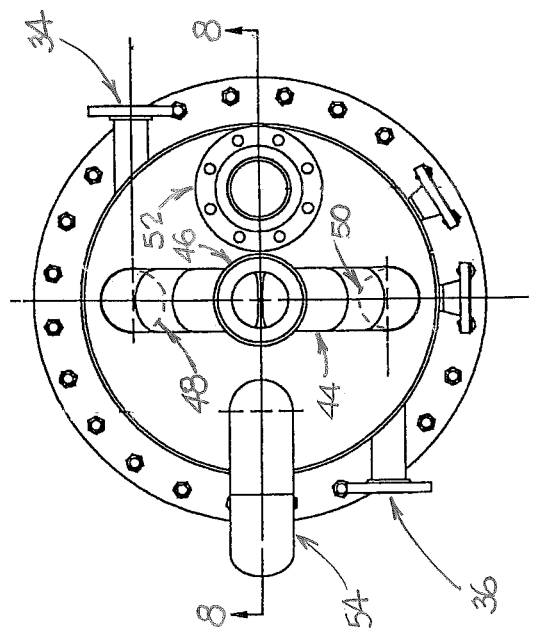
FIG. 7 is a top view of the embodiment of the invention shown in FIGS. 1-3, 5 and 6.

Upper section 22 of preferred blender 20 includes cylindrical receiving portion 32 (best shown in FIGS. 6 and 8) for receiving the viscous material and the additive material. In this embodiment of the invention, first viscous material inlet 34 and second viscous material inlet 36 are provided for the viscous material. First viscous material inlet 34 includes a first tube section 38 that extends into receiving portion 32, as shown in FIG. 6, so as to be generally tangential to inner wall 40 of receiving portion 32. Preferably, the inner end of first tube section 38 has a generally vertical cut at an angle Θ of about 30° with the short side of the tube section being located adjacent inner wall 40 of the receiving portion. It is also preferred that first tube section 38 extend into receiving portion 32 a distance "D" (measured along the long side of first tube section 38) that is within the range of 35-50%, most preferably about 42.5% of the inside diameter of cylindrical inner wall 40 of the receiving portion. Second viscous material inlet 36 is spaced 180° around receiving portion 32 from first viscous material inlet 34. Second viscous material inlet 36 includes a second tube section 42 that extends into receiving portion 32, as shown in FIG. 6, so as to be generally tangential to inner wall 40 of receiving portion 32. Preferably, the inner end of second tube section 42 has a generally vertical cut at the same angle as that of the inner end of first tube section 38. In other words, it is preferred that the inner end of second tube section 42 has a generally vertical cut at an angle Θ of about 30° with the short side of the tube section being located adjacent inner wall 40. It is also preferred that second tube section 42 extend into receiving portion 32 the same distance as first tube section 38. In other words, it is preferred that second tube section 42 extend into receiving portion 32 a distance "D" (measured along the long side of second tube section 42) that is within the range of 35-50%, most preferably about 42.5% of the inside diameter of cylindrical inner wall 40 of the receiving portion.

Upper section 22 of blender 20 also has an additive inlet for the additive material that is in fluid communication with receiving portion 32. Preferably, the additive inlet for the additive material is adapted to direct additive material into the stream or flow of viscous material that is entering the receiving portion by way of a viscous material inlet. In the embodiment of the invention illustrated in the drawings, the additive inlet includes Y-shaped additive inlet manifold 44 having inlet opening 46 and first discharge outlet 48 and second discharge outlet 50 into receiving portion 32. As shown by comparing FIGS. 6 and 7, first discharge outlet 48 is located directly above the inner end of first tube section 38 of first viscous material inlet 34. Similarly, second discharge outlet 50 is located directly above the inner end of second tube section 42 of second viscous material inlet 36. This arrangement permits additive materials to be discharged generally vertically downwardly into the generally tangential flows of viscous materials from first tube section 38 and second tube section 42. Upper section 22 of blender 20 also includes flange connection 52 for a level gauge and vent outlet 54 that is in fluid communication with receiving portion 32 of upper section 22.

Figure 4:
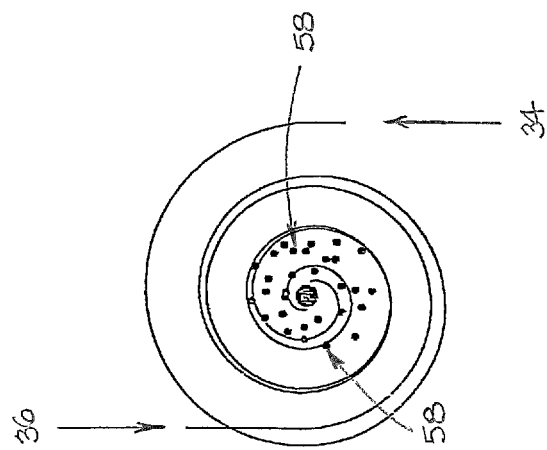
FIG. 4 is a top view of the vortex blending action that is achieved by the cooperation of the shape of the blending portion and the arrangement and configuration of the viscous material inlets and the additive material inlets of the preferred embodiment of the invention.
Figure 8:
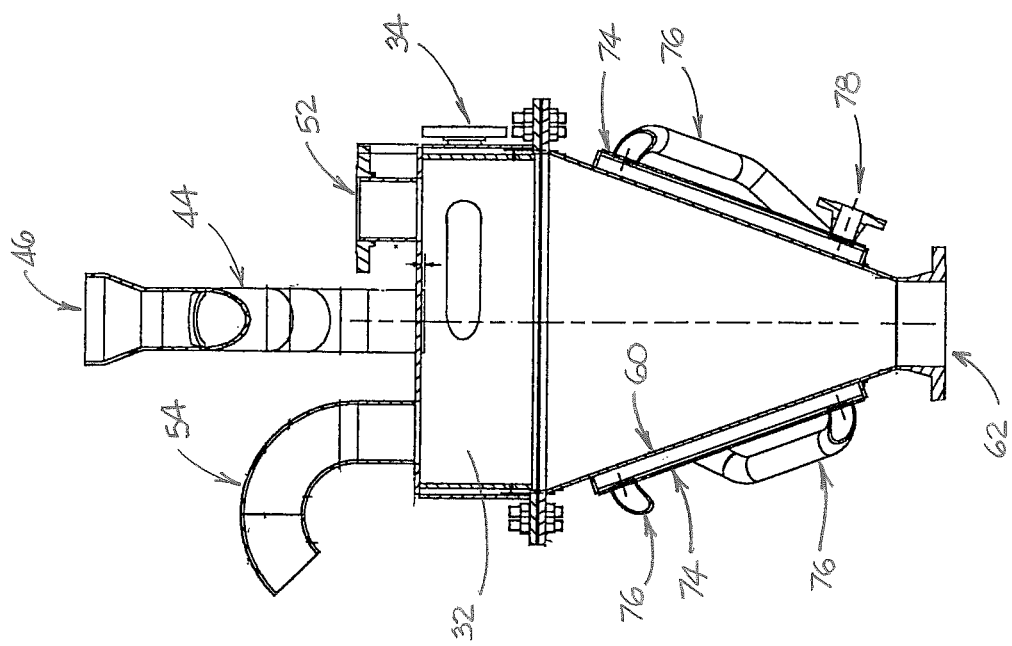
FIG. 8 is a sectional view of the embodiment of the invention shown in FIGS. 1-3 and 5-7, taken through line 8-8 of FIG. 7.

Lower section 24 includes blending portion 56 that is in fluid communication with receiving portion 32 of the upper section. The blending portion is shaped so as to facilitate the blending of additive material 58 (shown in FIG. 4) entering through discharge outlets 48 and 50 of additive inlet manifold 44 with viscous material entering through viscous material inlets 34 and 36. Preferably blending portion 56 has a generally conical inner surface 60, as best shown in FIGS. 8 and 9. The cooperation of the generally conical shape of the inner surface of blending portion 56 and the arrangement and configuration of first viscous material inlet 34, second viscous material inlet 36, and first discharge outlet 48 and second discharge outlet 50 of additive inlet manifold 44, facilitates blending of the viscous material and the additive material by vortex action, as shown in FIG. 4. At the bottom of blending portion 56 is outlet 62 for blended material.

Blender 20 also includes a heat transfer component comprising first thermal fluid jacket 64 and second thermal fluid jacket 66. As shown in FIG. 6, first thermal fluid jacket 64 comprises an outer cylindrical wall that is spaced from inner cylindrical wall 40 of receiving portion 32 to form a first thermal fluid passage in the form of annular fluid channel 68 between the outer cylindrical wall and the inner cylindrical wall. Annular fluid channel 68 is in conductive contact with inner cylindrical wall 40 of receiving portion 32 of the upper section. Heat transfer fluid inlet 70 is provided in the first thermal fluid jacket, as is heat transfer fluid outlet 72. Preferably, heat transfer fluid outlet 72 is spaced from heat transfer fluid inlet 70 by an angle φ that is equal to about 30°.

Figure 3:
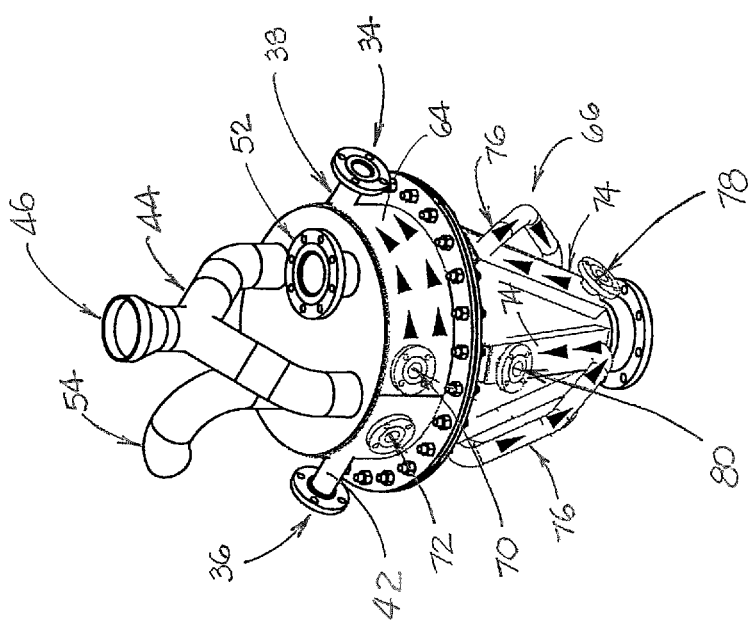
FIG. 3 is a front perspective view of the preferred embodiment of the invention shown in FIGS. 1 and 2, showing the flow pattern for thermal fluid in the heat transfer component.

Second thermal fluid jacket 66 is provided to create a second thermal fluid passage that is in conductive contact with the outer surface of blending portion 56. In the embodiment of the invention illustrated in the drawings, second thermal fluid jacket 66 is comprised of a plurality of rectangular channels 74 and a plurality of connecting pipes 76 that are in fluid communication with each other. Preferably, as shown in the drawings, rectangular channels 74 are spaced around and are in conductive contact with blending portion 56 of lower section 24, and each of connecting pipes 76 is in fluid communication with a pair of adjacent rectangular channels. Furthermore, it is also preferred that the plurality of connecting pipes 76 are not in conductive contact with blending portion 56 of the lower section. Thermal fluid inlet 78 is provided in the second thermal fluid jacket, as is thermal fluid outlet 80. The arrangement and fluid communication of the rectangular channels and the connecting pipes is best illustrated in FIGS. 10-13 (where the angle α is preferably about 30° and the angle β is preferably about 60°), and the flow pattern of thermal fluid therethrough is shown in FIG. 3. Preferably, the second thermal fluid passage is also in fluid communication with the first thermal fluid passage.

When the invention is operated to blend SBS polymer pellets with asphalt cement, the asphalt cement, preferably having a viscosity no greater than about 700 SSU, is introduced through each of inlets 34 and 36 at a rate of about 110 gallons/minute, for a total introduction of about 220 gallons/minute. The asphalt cement so introduced will typically have a temperature within the range of about 365° to about 375° F., most preferably about 370° F. Heat transfer fluid or media, preferably comprising hot oil, is introduced into the first thermal fluid jacket through inlet 70 at a rate of about 100 gallons/minute. This heat transfer fluid will then flow out of outlet port 72 of the first thermal fluid passage and into heat transfer fluid inlet 78 of the second thermal fluid passage before exiting heat transfer fluid outlet 80 for reheating and recirculation. In some embodiments of the invention, a fluid heating device (not shown) may be provided to heat the heat transfer fluid between outlet port 72 of the first thermal fluid passage and inlet port 78 of the second thermal fluid passage. Preferably, the thermal fluid is heated so as to have a temperature within the range of about 350° to about 450° F., most preferably about 425° F. SBS polymer pellets are preferably introduced into inlet manifold opening 46 at a rate of about 110 pounds/minute, which, because of the shape of inlet manifold 44, should be discharged approximately equally into the generally tangential flows of asphalt cement being introduced through first viscous material inlet 34 and second viscous material inlet 36. Blender 20 will thoroughly blend the SBS polymer pellets with the asphalt cement as shown in FIG. 4, and will discharge the blended material, on a continuous basis, through outlet 62 at a rate within the range of about 250 gallons/minute to about 350 gallons/minute and at a temperature within the range of about 330° to about 370° F., most preferably about 350° F.

The invention thus comprises a blender for asphalt cement and polymer pellets or other additives that has no internal moving parts such as impellers or mixing blades. Furthermore, this blender provides a thorough dispersion of the additives in the asphalt cement in a relatively short time, thus reducing the heating of the additives by the hot asphalt cement.

Although this description contains many specifics, these should not be construed as limiting the scope of the invention, but as merely providing illustrations of the presently preferred embodiment thereof, as well as the best mode contemplated by the inventors of carrying out the invention. The invention, as described and claimed herein, is susceptible to various modifications and adaptations, as would be understood by those having ordinary skill in the art to which the invention relates.

What is claimed is:

1. A blender for blending viscous material and additive material, said blender comprising:
    (a) an upper section comprising:
        (i) a receiving portion;
        (ii) a viscous material inlet for directing viscous material into the receiving portion;
        (iii) an additive inlet for directing additive material into the receiving portion;
    (b) a lower section that is attached to and disposed below the upper section, said lower section comprising a blending portion that is in fluid communication with the receiving portion of the upper section, said blending portion being shaped so as to facilitate the blending of the additive material entering the receiving portion through the additive inlet with the viscous material entering the receiving portion through the viscous material inlet;
    (c) an outlet for blended material that is in fluid communication with the blending portion of the lower section;
    (d) a heat transfer component that is in conductive contact with:
        (i) the receiving portion of the upper section;
        (ii) the blending portion of the lower section;
    wherein the cooperation of the shape of the blending portion and the arrangement and configuration of the viscous material inlet and the additive inlet facilitates blending of the viscous material and the additive material by vortex action.

2. The blender of claim 1 wherein the blending portion has a generally conical inner surface.

3. The blender of claim 1:
    (a) wherein the upper section includes an upper peripheral flange with a plurality of fastener holes spaced around said upper peripheral flange;
    (b) wherein the lower section has a lower peripheral flange that is complementary to the upper peripheral flange and includes a plurality of fastener holes spaced around said lower peripheral flange and aligned with the plurality of fastener holes in the upper peripheral flange;
    (c) which includes a plurality of bolt and nut assemblies that are adapted to join together the upper section and the lower section.

4. The blender of claim 1 wherein the upper section includes a vent outlet that is in fluid communication with the receiving portion of the upper section.

5. The blender of claim 1 wherein:
    (a) the receiving portion has a cylindrical inner wall;
    (b) the viscous material inlet includes a tube section that extends into the receiving portion so as to direct viscous material in a flow direction that is generally tangential to the cylindrical inner wall;
    (c) the additive inlet is arranged so as to discharge additive materials generally vertically downwardly into the generally tangential flow of viscous materials from the first tube of the viscous material inlet.

6. The blender of claim 5 wherein the tube section:
    (a) has an inner end that is cut at an angle to create a short side of the tube section and a long side of the tube section, said cut being arranged so that the short side of the tube section is located adjacent the inner wall;
    (b) extends into the receiving portion a distance, when measured along the long side of tube section, that is within the range of 35-50% of the inside diameter of the cylindrical inner wall of the receiving portion.

7. The blender of claim 1 wherein:
    (a) the receiving portion has a cylindrical inner wall;
    (b) the upper section includes a first viscous material inlet and a second viscous material inlet, wherein:
        (i) the first viscous material inlet includes a first tube section that extends into the receiving portion so as to direct viscous material in a direction that is generally tangential to the cylindrical inner wall;
        (ii) the second viscous material inlet is spaced about 180° around the receiving portion from the first viscous material inlet;
        (iii) the second viscous material inlet includes a second tube section that extends into the receiving portion so as to direct viscous material in a direction that is generally tangential to the cylindrical inner wall.

8. The blender of claim 7 wherein:
    (a) the first tube section:
        (i) has an inner end that is cut at an angle to create a short side of the first tube section and a long side of the first tube section, said cut being arranged so that the short side of the first tube section is located adjacent the inner wall;
        (ii) extends into the receiving portion a distance, when measured along the long side of first tube section, that is within the range of 35-50% of the inside diameter of the cylindrical inner wall of the receiving portion;

(b) the second tube section:
  (i) has an inner end that is cut at an angle to create a short side of the second tube section and a long side of the second tube section, said cut being arranged so that the short side of the second tube section is located adjacent the inner wall;
  (ii) extends into the receiving portion a distance, when measured along the long side of second tube section, that is within the range of 35-50% of the inside diameter of the cylindrical inner wall of the receiving portion.

9. The blender of claim 8 wherein the additive inlet comprises a Y-shaped additive inlet manifold which comprises:
  (a) an inlet opening;
  (b) a first discharge outlet that is located directly above the inner end of the first tube section;
  (c) a second discharge outlet that is located directly above the inner end of the second tube section.

10. The blender of claim 1 wherein the heat transfer component comprises:
  (a) a first thermal fluid jacket having a first thermal fluid passage that is in conductive contact with the receiving portion of the upper section;
  (b) a second thermal fluid jacket comprising a second thermal fluid passage that is in conductive contact with the blending portion of the lower section;
  (c) a thermal fluid inlet;
  (d) a thermal fluid outlet.

11. The blender of claim 10 wherein:
  (a) the thermal fluid inlet is in fluid communication with the first thermal fluid passage;
  (b) the second thermal fluid passage is in fluid communication with the first thermal fluid passage.

12. The blender of claim 10 wherein:
  (a) the receiving portion has a cylindrical inner wall;
  (b) the first thermal fluid jacket comprises an outer cylindrical wall that is spaced from the cylindrical inner wall of the receiving portion to form the first thermal fluid passage in the form of an annular fluid channel between the outer cylindrical wall and the cylindrical inner wall of the receiving portion.

13. The blender of claim 12 wherein the first thermal fluid jacket includes:
  (a) a heat transfer fluid inlet;
  (b) a heat transfer fluid outlet that is spaced from the heat transfer fluid inlet by an angle of about 30°.

14. The blender of claim 10 wherein the second thermal fluid jacket comprises:
  (a) a plurality of rectangular channels that are spaced around and in conductive contact with the blending portion of the lower section;
  (b) a plurality of connecting pipes, each of which is in fluid communication with a pair of adjacent rectangular channels;
  (c) a thermal fluid inlet;
  (d) a thermal fluid outlet.

15. The blender of claim 14 wherein the plurality of connecting pipes are not in conductive contact with the blending portion of the lower section.

16. A blender for blending viscous material and additive material, said blender comprising:
  (a) an upper section comprising:
    (i) a receiving portion having a generally cylindrical inner wall;
    (ii) a viscous material inlet into the receiving portion which viscous material inlet is adapted to direct viscous material in a direction that is generally tangential to the inner wall of the receiving portion;
    (iii) an additive inlet into the receiving portion which additive inlet is adapted to direct additive material generally vertically downwardly into the generally tangential flow of viscous material from the viscous material inlet;
  (b) a lower section that is attached to and disposed below the upper section, said lower section comprising a blending portion:
    (i) that is in fluid communication with the receiving portion of the upper section;
    (ii) having a generally conical inner surface;
  (c) an outlet for blended material that is in fluid communication with the blending portion of the lower section;
  (d) a heat transfer component that is in conductive contact with:
    (i) the receiving portion of the upper section;
    (ii) the blending portion of the lower section.

* * * * *